United States Patent

Kawai et al.

[11] Patent Number: 5,534,935
[45] Date of Patent: Jul. 9, 1996

[54] PROCESSING APPARATUS FOR PROGRESSIVE SCAN GENERATION OF A TELEVISION SIGNAL

[75] Inventors: Kiyoyuki Kawai, Yokosuka; Yoshihide Kimata, Tokyo; Masayuki Ishida, Yokohama, all of Japan

[73] Assignees: Kabushiki Kaisha Toshiba, Kawasaki; Nippon Television Network Corporation, Tokyo, both of Japan

[21] Appl. No.: 329,855

[22] Filed: Oct. 27, 1994

[30] Foreign Application Priority Data

Oct. 29, 1993 [JP] Japan ................... 5-271844

[51] Int. Cl.[6] ....................... H04N 7/015
[52] U.S. Cl. ............... 348/448; 348/452; 348/458
[58] Field of Search ....................... 348/448, 441, 348/452, 458, 443; H04N 7/01, 7/015

[56] References Cited

U.S. PATENT DOCUMENTS

| | | |
|---|---|---|
| 4,673,978 | 6/1987 | Dischert et al. |
| 5,204,745 | 4/1993 | Kawai et al. ............... 348/448 |
| 5,365,274 | 11/1994 | Seki ............... 348/458 |
| 5,402,186 | 3/1995 | Kawai ............... 348/448 |

FOREIGN PATENT DOCUMENTS

| | | |
|---|---|---|
| 0266079 | 5/1988 | European Pat. Off. |
| 0447214 | 9/1991 | European Pat. Off. |
| 4-3151 | 1/1992 | Japan. |

*Primary Examiner*—Victor R. Kostak
*Attorney, Agent, or Firm*—Cushman Darby & Cushman

[57] ABSTRACT

A processing apparatus employs motion-adaptive processing to create a progressive scanning signal from an interlaced television scanning signal. The interlaced scanning signal is input to a field delay circuit and to a vertical highpass filter, the output of the field delay circuit is input to a field delay circuit and to a vertical lowpass filter, and the output of the field delay circuit is input to a vertical highpass filter. The outputs of the vertical highpass filters are added together at an adder. The output of the adder is added to the output of the vertical lowpass filter to create an interpolation signal. The interpolation signal and direct-type signal, being time-compressed, are coupled to a switch where they are alternately selected to obtain a progressive scanning signal with improved image quality, irrespective of whether the input signal represents a still or moving image.

6 Claims, 10 Drawing Sheets

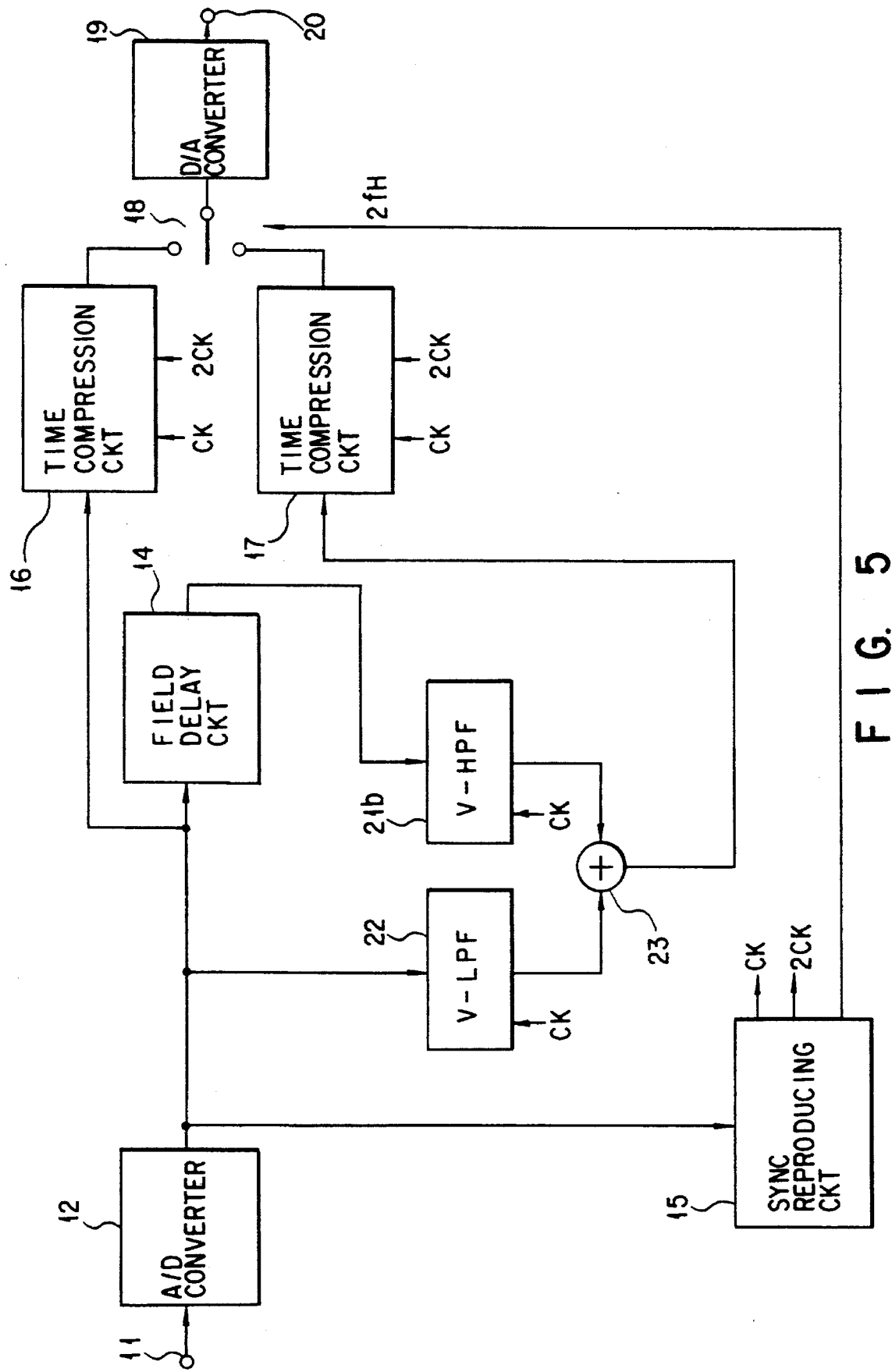
F I G. 5

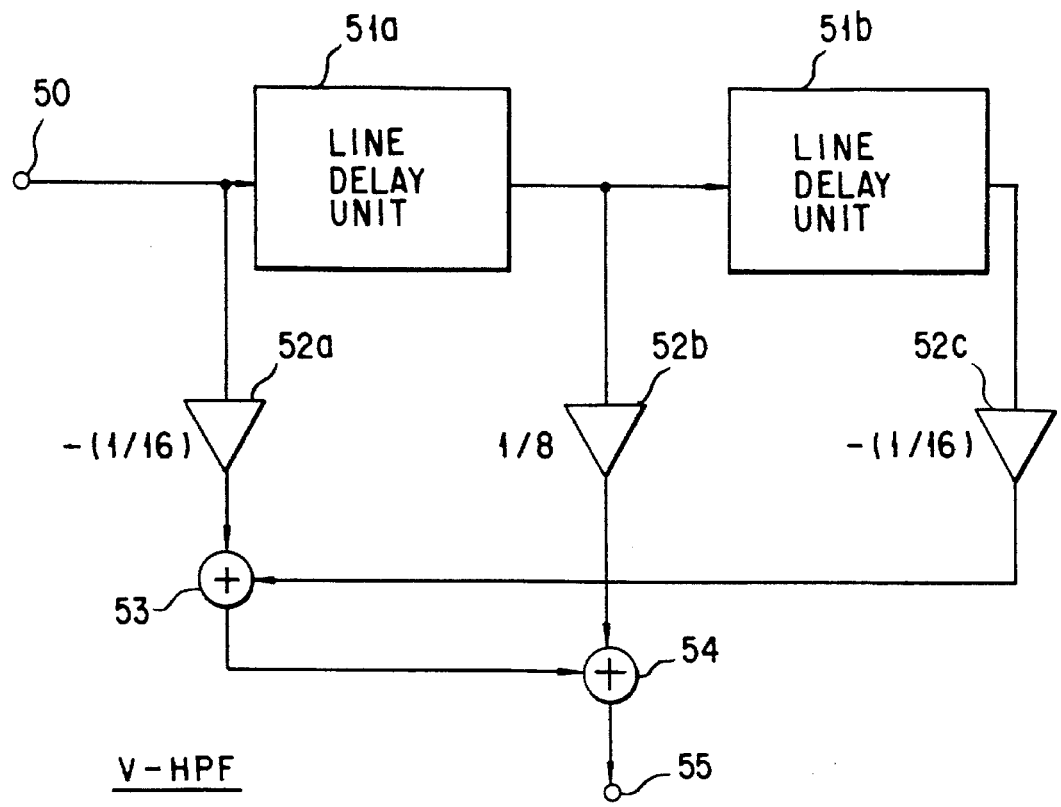
F I G. 6A
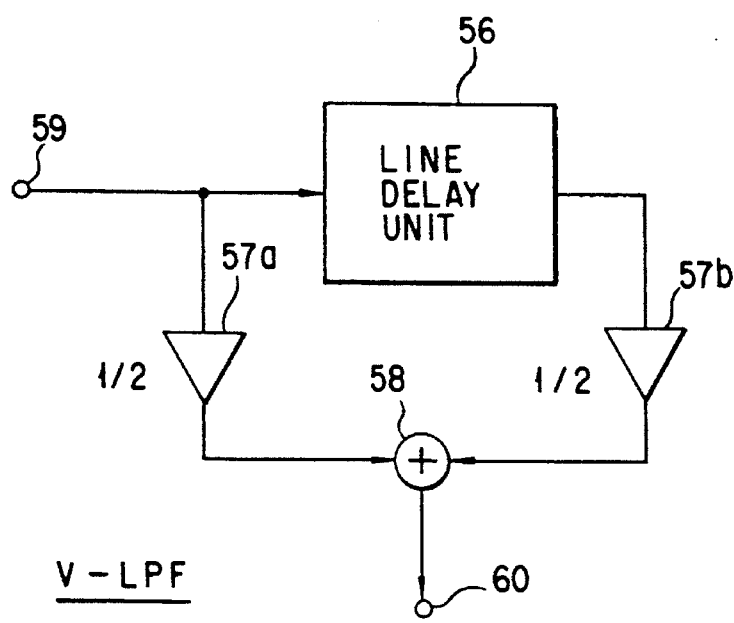
F I G. 6B

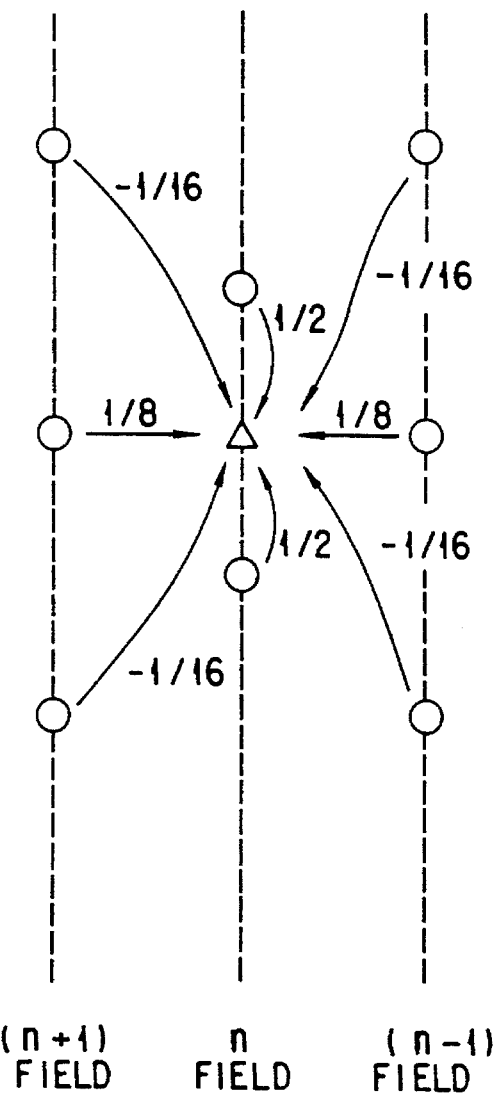
F I G. 7
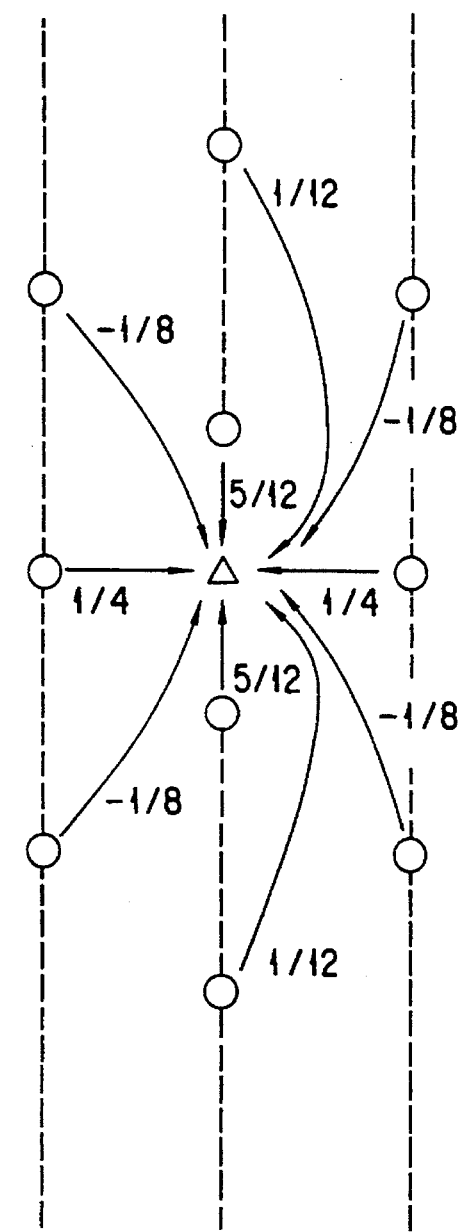
F I G. 9

PROCESSING APPARATUS FOR PROGRESSIVE SCAN GENERATION OF A TELEVISION SIGNAL

BACKGROUND OF THE INVENTION

1. Field of the Invention

The present invention relates to a processing apparatus for converting a television scanning signal, and more particularly, to an apparatus employing motion-adaptive processing to create a progressive scanning signal with improved image quality from an interlaced television scanning signal.

2. Description of the Related Art

According to a known motion-adaptive technique for converting a scanning line number of a television signal, are formed two types of interpolation signals, a motion image-matching interpolation signal and a still image-matching interpolation signal. These signals are obtained through intra-field interpolation processing and inter-field interpolation processing, respectively. A circuit employing in this technique a scanning line interpolation signal is selected in accordance with the movement of the image. This conversion technique is illustrated in, for example, Japanese Patent Application Kokai Publication No. 4-3151 and will be explained below to reference with FIG. 1. In this illustrated circuit, an input interlaced scanning signal is converted to a progressive scanning signal to having twice the number of scanning lines as the input signal by combining an interpolation signal formed from the input signal and the input signal per se. Having two interpolation signal forming routes are provided, one in which a motion image-matching interpolation signal is formed and in which a still image-matching interpolation signal is formed. The motion image-matching interpolation signal is formed from canning line signals within the same field and the still image-matching interpolation signal is formed from scanning signals from a preceding field and/or a following field. A motion detecting signal generated by a motion detection circuit causes either the still image-matching interpolation signal or the motion image-matching interpolation signal to be properly selected in accordance with a still image mode or motion image mode of the input signal.

In FIG. 1, an interlaced scanning signal is supplied to an input terminal 312. The input signal is supplied to a field delay circuit 314 and to a subtracter 319. The output of the field delay circuit 314 is input to a field delay circuit 315, a line delay circuit 316 giving an amount of delay corresponding to one horizontal period, adder 317 and time compression circuit 324. The signal to the time compression circuit 324 is of a direct type.

The output of the field delay circuit 315 is input to the subtracter 319 and coefficient unit 322 and the output of the coefficient unit 322 is input to an adder 323. The output of the line delay circuit 316 is input to the adder 317. The output of the adder 317 is sent through ½ coefficient unit 318 and then through a coefficient unit 321 to the adder 323. The output of the adder 323 is of an interpolation type and is input to a time compression circuit 325 where it is time-compressed. The output of the time compression circuit 325 is supplied to one contact of a switch 326. The output of the time compression circuit 324 is supplied to the other contact of the switch 326. The selected output of the switch 326 is derived from an output terminal 313.

The output of the subtracter 319 is input to a motion detector 320. The motion detection signal of the motion detector 320 determines whether the input signal corresponds to the motion image mode or the still image mode and delivers a corresponding signal to the control terminals of the coefficient units 322 and 321.

A route consisting of line delay circuit 316, adder 317, ½ coefficient unit 318 and coefficient unit 321 is provided for generating the motion image-matched interpolation signal. An alternative route consisting of field delay circuit 315 and coefficient unit 322 is provided for generating the still image-matching interpolation signal. If the movement of the image is greater, the coefficients of coefficient units 321 and 322 are made greater and smaller, respectively, so that the adder 323 produces the motion image-matching interpolation signal. If, on the other hand, the still image is involved, the coefficients of the efficient units 321 and 322 are made smaller and greater, respectively, so that the adder 323 produces the still image-matching interpolation signal. Both the direct type signal and the interpolation type signal are time-compressed and alternately and selectively supplied through the switch 326 to the output terminal. By doing so, a progressive scanning signal emerges from the output terminal 313 as an output signal having twice the number of scanning lines as the input interlaced scanning signal.

In the above conversion circuit, when conversion is performed by the inter-field interpolation processing for the still image mode, it is advantageous to entirely avoid a vertical-direction lowered response and eliminate an inter-line flicker on the still image. Furthermore when the motion detector erroneously determines a still image mode; in spite of the input signal being in the motion image creates mode, the output signal produced by the inter-field interpolation processing a degeneration of the image. In other words, when the motion detector incorrectly determines that the input signal is in a still image mode, then an interpolation signal will be created from the preceding field. Thus, in this case, if inter-field image movement occurs, a residual image will emerge on the screen, thus leading to a degenerated image. This defect is visually very perceptible.

In the motion image mode, intra-field interpolation processing is carried out, but only 240 scanning lines information are used for the interlaced scanning signal. For this reason, the vertical image resolution is limited to 120 cph (cycle per picture height) according to the Sampling Theorem Principle. For the filtering characteristic of a real circuit, the effective resolution is even further reduced.

According to the example shown in FIG. 1, the input signal may be considered as being 2-line interval sampling data (240 TVL/PH =240 TV Line Per Picture Height). Thus, for the input signal, if scanning line interpolation is carried out using "0" data, the sampling data is seemingly up-converted to one-line interval sample data (480 TVL/PH), this being equivalent to the processing made by a vertical lowpass filter equipped with three taps (coefficients: 0.5, 1, 0, 0.5). The filter characteristic of the intra-field interpolation processing corresponds to a cosine-squared characteristic with vertical space frequencies 120 cph and 240 cph at −6db and a null point, respectively. The above filter characteristic means that, first, those components near the 120 cph (240 TVL/PH) are attenuated due to the pass band of the filter not being flat, Therefore, the frequency characteristic of the processing exerts a greater influence on the vertical sharpness, that is, the image quality is prominently degraded and highly blurred. Second, the above filter characteristic means that, high-frequency components of over 120 cph are not attenuated by the filter and emerge as aliasing components, further degenerating image quality.

Let it be assumed that, when a still image having adequate vertical high-frequency components is entered, motion image-mode processing (intra-field interpolation processing) is erroneously carried out due to an operational error of the motion detector. In this case, image quality becomes markedly degenerated with the emergence of greater aliasing components on the screen.

The selection of inter-field interpolation or intra-field interpolation processing is controlled by the determination of the motion detector. Since the input signal is composed of an interlaced scanning signal, offset sampling is made between the fields. Usually, the motion components are detected by means of an inter-frame difference calculation. The motion detector is comprised of a band pass filter having a cosine characteristic with a peak at 15 Hz and a level "0" at 0 Hz and 30 Hz in a temporal direction frequency region. Originally, the motion detection must allow for detection of a temporal components ranging from over 0 Hz up to 30 Hz. However, the 30 Hz motion component essentially cannot be detected because the input signal is used for a interlaced scanning and, in other words, there may be some cases where the motion detection cannot account for a quick motion image.

With the conventional scanning line number converting apparatus, when, as set out above, an operation error arises in the motion detection for motion-adaptive processing, the resulting image quality is greatly degenerated. Furthermore, a great difference in image quality arises between the still image mode and the motion image mode. That is, even in the case where no operation error occurs upon the detection of the motion, image quality is not adequate in the motion image mode. It is, therefore, theoretically impossible to avoid detection and operation errors with the conventional motion circuit. In view of this situation, more efforts are demanded to further improve image quality that is, the scanning line number conversion output obtained through the motion-adaptive processing.

SUMMARY OF THE INVENTION

It is accordingly the object of the present invention to provide a processing apparatus for converting a television scanning signal with improved image quality, irrespective of whether a still image or a motion image is obtained, when the scanning line number is converted.

According to the present invention, there is provided a processing apparatus for converting a television scanning signal, comprising:

vertical low-frequency component extracting means for extracting a vertical low-frequency component from a first interlaced scanning signal;

vertical high-frequency component extracting means for extracting a vertical high-frequency component from a second interlaced scanning signal in preceding and following fields of the first interlaced scanning signal;

interpolation signal generating means for generating an interpolation scanning signal by adding together the vertical low-frequency component and vertical high-frequency components;

first time compression means for subjecting the first interlaced scanning signal to time compression;

second time compression means for subjecting the interpolation scanning signal to time compression; and selecting means for alternately selecting the outputs of the first and second time compression means and for obtaining a progressive scanning signal.

The major feature of the aforementioned means lies in that a scanning signal (interpolation scanning signal) is created as a signal corresponding to an intermediate position of those scanning lines of an interlaced scanning signal. The vertical low-frequency component extracting means serves as an interpolation filter to a specific field's signal and creates a low-frequency component scanning line decimated at the interlaced scanning. In a 525-lines-per-frame interlaced scanning signal, however, the filter characteristic is of the order of −6dB at a 240 TVL/PH and the vertical sharpness is deficient with this component alone. From this viewpoint the output of the vertical high-frequency component extracting means is utilized effectively, that is, the vertical high-frequency component extracting means extracts vertical high-frequency components at the preceding and following fields relative to a specific field. These high-frequency components are added to the low-frequency component scanning line to correct the vertical sharpness so that, even for the motion image, it is possible to obtain a high image quality.

For the still image, even if those inter-field signals are added, there arises no problem. For the motion image, however, a residual image emerges. Accordingly, those components to be added between the fields are made vertical high-frequency components only. As a result, it is possible to obtain a natural image irrespective of whether the still image or the motion image is involved. A conventional apparatus depends largely upon the accuracy with which the motion detection is made. According to the present system, however, it is not necessarily required that the motion-adaptive interpolation processing be carried out.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a schematic view showing a fourth embodiment of the present invention;

FIG. 6A shows a vertical highpass filter used in the apparatus of the present invention;

FIG. 6B shows a vertical lowpass filter used in the apparatus of the present invention;

FIG. 7 is an explanatory view showing interpolation scanning line generation processing in the embodiments of FIGS. 1 and 2 using those filters of FIGS. 6A and 6B;

FIG. 9 is an explanatory view showing interpolation scanning line generation processing in the embodiments of FIGS. 2 and 3 using those filters of FIGS. 8A and 8B;

DETAILED DESCRIPTION OF THE PREFERRED EMBODIMENTS

The embodiments of the present invention will be described below with reference to the accompanying drawings.

Figure 1:
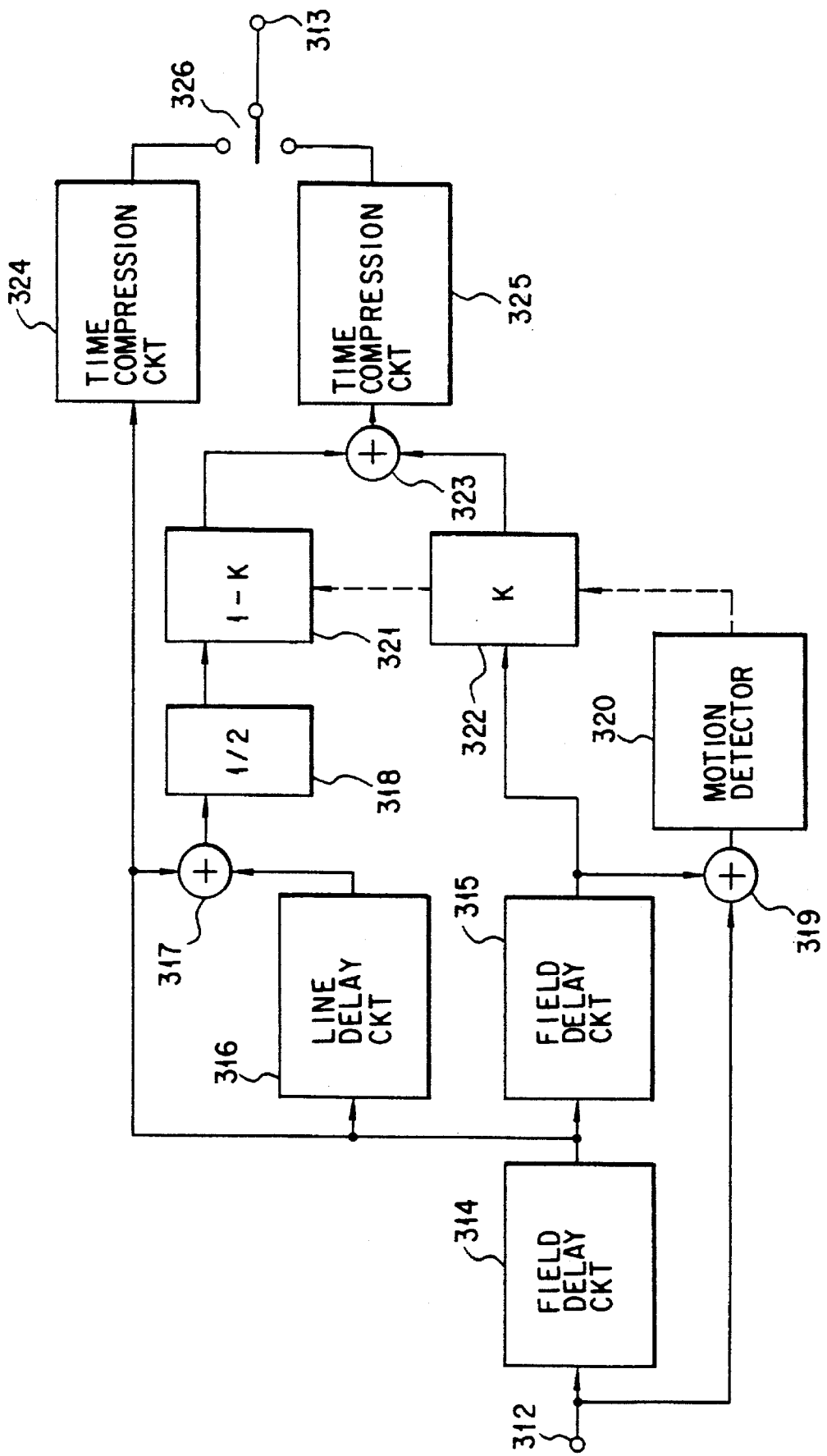
FIG. 1 is a schematic view showing a conventional scanning line number conversion circuit.
Figure 2:
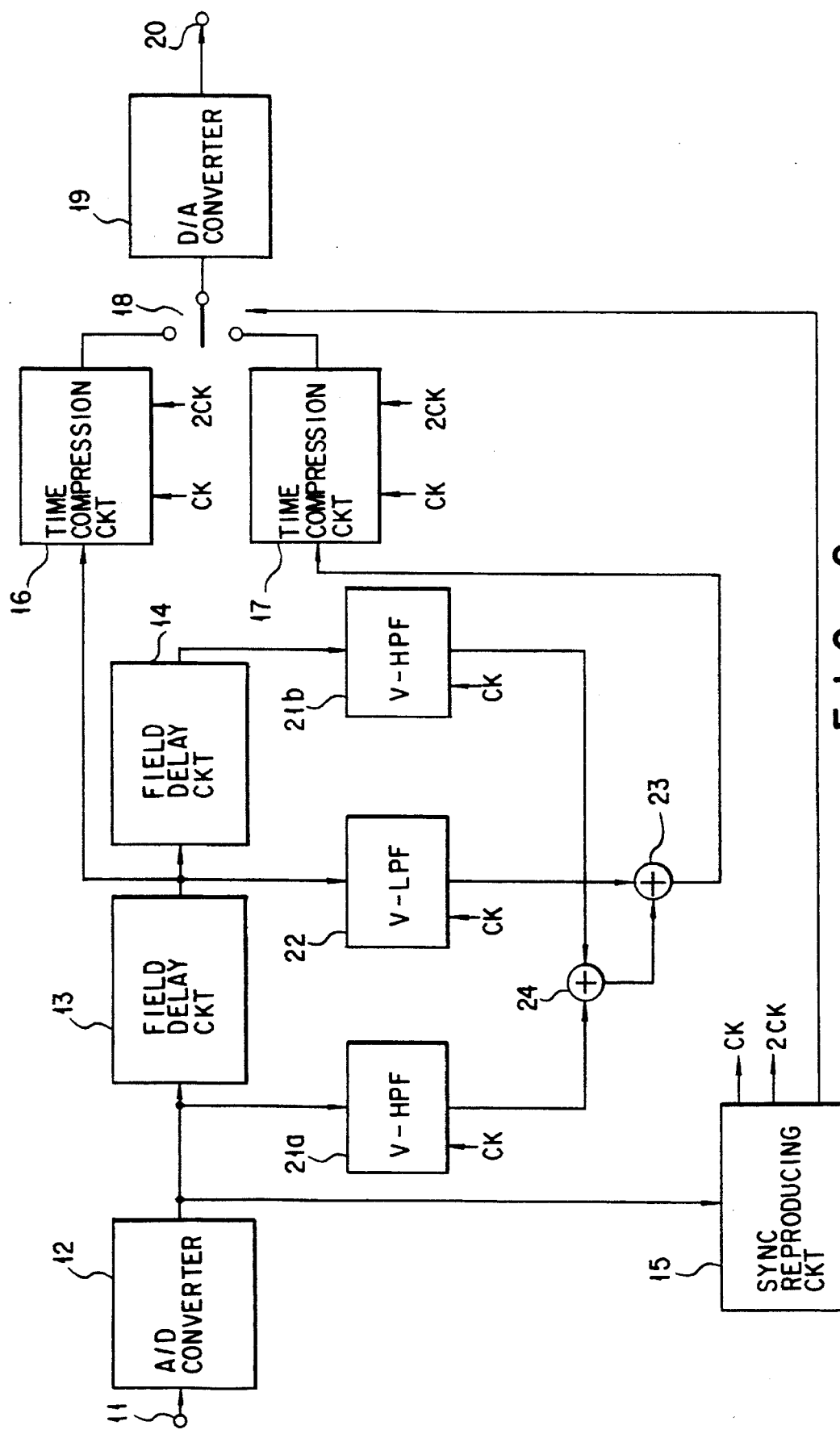
FIG. 2 is a schematic view showing an apparatus according to a first embodiment of the present invention.

FIG. 2 Shows a first embodiment of the present invention. An interlaced scanning signal is supplied to an input terminal 11 and then to an analog/digital (A/D) converter 12 where it is converted to a digital signal. The output of the A/D converter 12 is supplied to a field delay circuit 13, sync reproducing circuit 15 and vertical highpass filter (V-HPF) 21a. The output of the field delay circuit 13 is supplied to a field delay circuit 14, vertical lowpass filter (V-LPF) 22 and time compression circuit 16. The output of the field delay circuit 14 is supplied to a vertical highpass filter (V-HPF) 21b. The outputs of the vertical highpass filters 21a and 21b are added together by an adder 24 and the output of the adder 24 is supplied to an adder 23. The output of the vertical lowpass filter 22 is supplied to the adder 23 and the output of the adder 23 is input to a time compression circuit 17. Time-compressed signals of the time-compression circuits 16 and 17 are supplied to the corresponding input terminals of a switch 18 and, being alternately selected by the switch, to the digital/analog (D/A) converter 19 so that a progressive scanning signal is derived from an output terminal 20. The sync reproducing circuit 15 extracts a synchronizing signal contained in the output of the A/D converter 12 and forms clocks CK, 2CK and switching timing signal for respective parts in the system. The switching signal for the switching of the switch 18 represents a frequency 2 fH, which is double the horizontal frequency fH of the input interlaced scanning signal.

An inter-frame vertical high-frequency component is obtained from the adder 24 and a vertical low-frequency component is extracted from the vertical lowpass filter 22. The high-frequency and low-frequency components are supplied to the adder 23 where both are added together to produce an output as a scanning line signal. The scanning line signal of the adder 23 is employed as an interpolation scanning signal and improves intra-field vertical sharpness.

Figure 3:
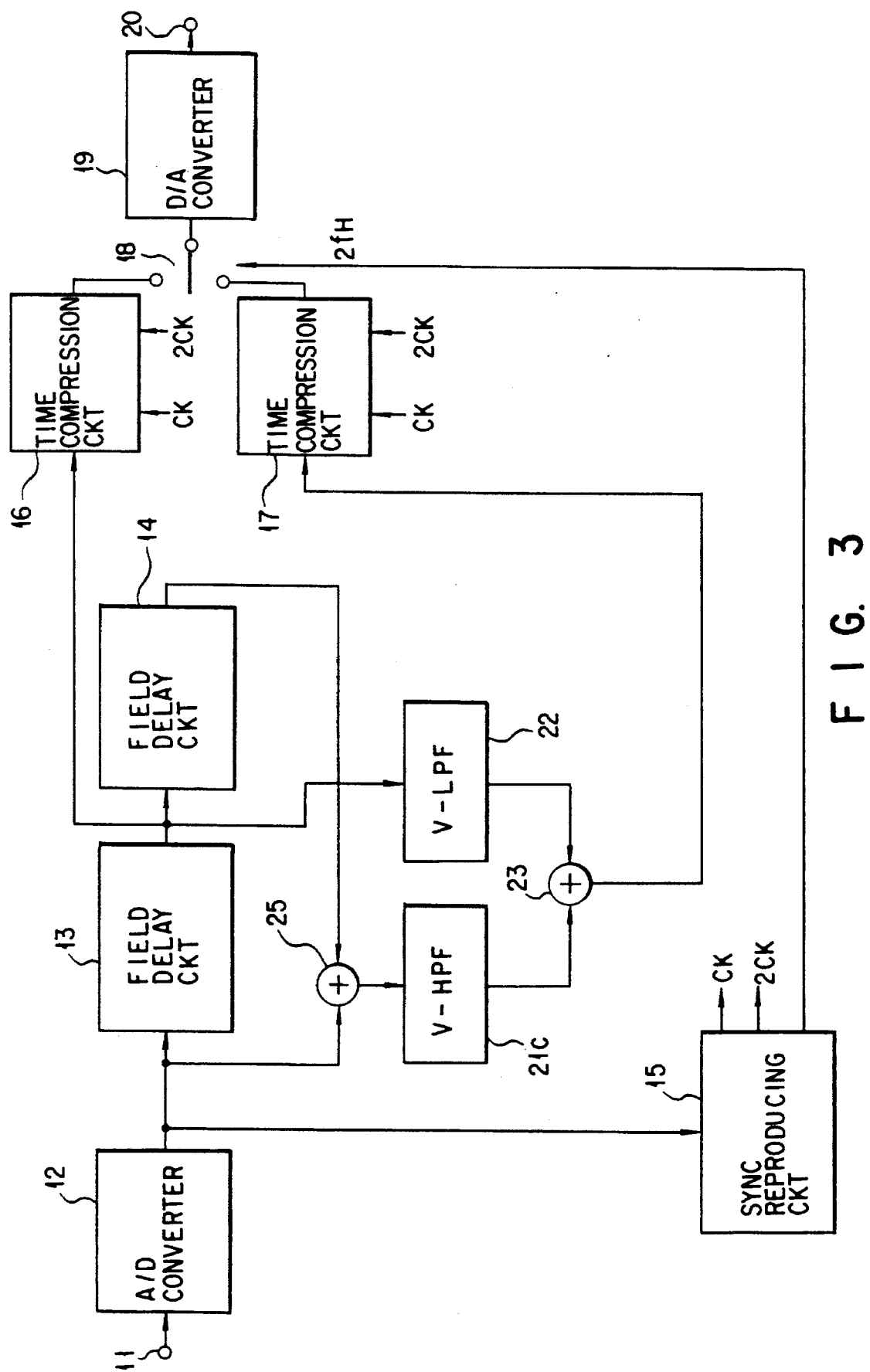
FIG. 3 is a schematic view showing an apparatus according to a second embodiment of the present invention.

FIG. 3 shows a second embodiment of the present invention.

Though being basically similar to the first embodiment, the second embodiment is somewhat different from the first embodiment. In the preceding embodiment, the vertical high-frequency components, being extracted from the input-side signal of the field delay circuit 13 and output-side signal of the field delay circuit 14, are added together. With the embodiment shown in FIG. 3, an input-side signal of a field delay-circuit 13 and output-side signal of a field delay circuit 14 are supplied to an adder 25. The output of the adder 25 is sent to a vertical highpass filter (V-HPF) 21 where a vertical high-frequency component is extracted. The vertical high-frequency component is input to an adder 23. The other portion of the second embodiment is substantially the same as the first embodiment of the present invention with the same references numerals employed to designate parts or elements corresponding to those shown in FIG. 2. Any further explanation is omitted for brevity's sake.

Figure 4:
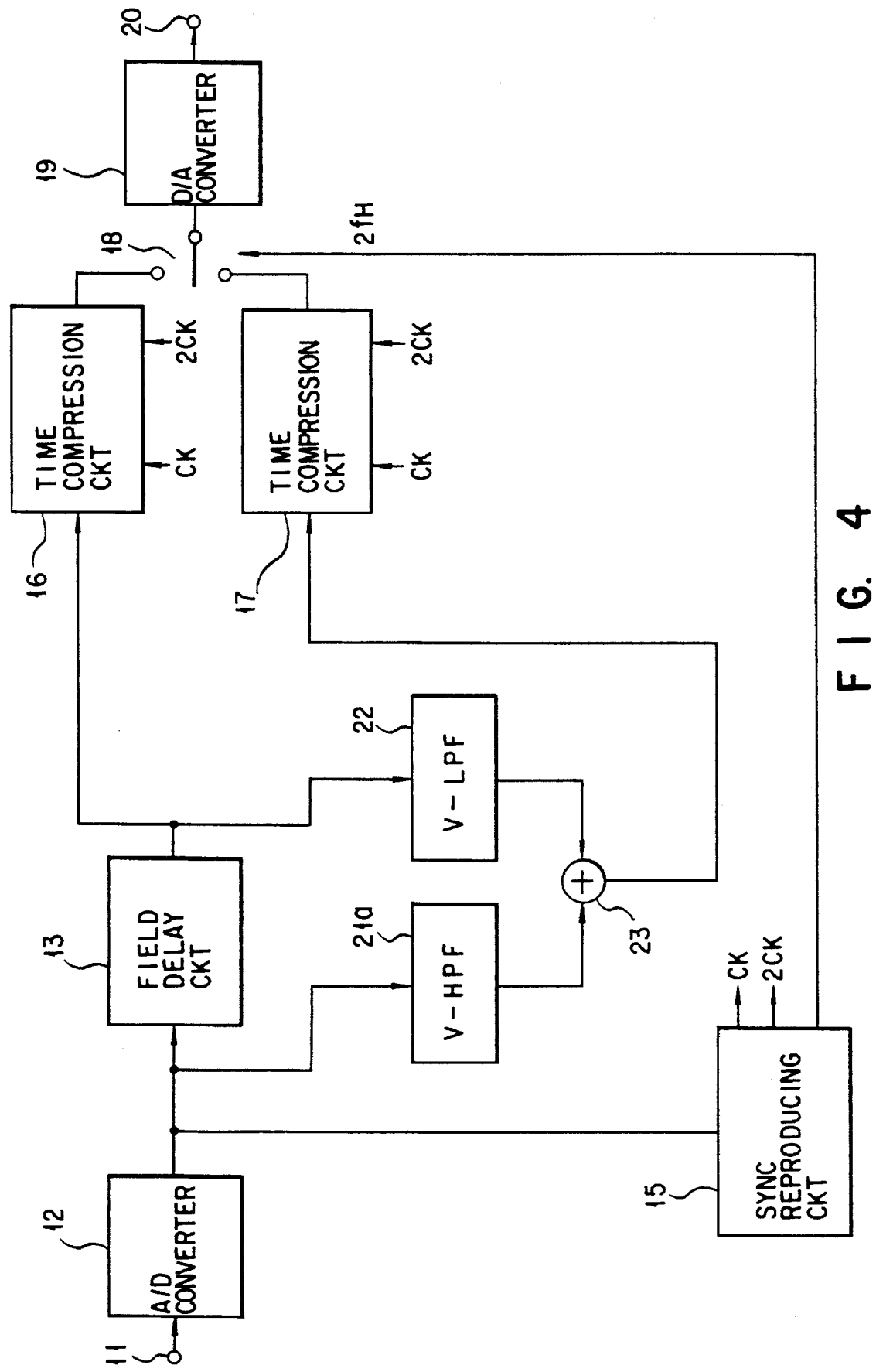
FIG. 4 is a schematic view showing an apparatus according to a third embodiment of the present invention.

FIG. 4 shows a third embodiment of the present invention. The third embodiment corresponds to the circuit of FIG. 2 with the field delay circuit 14, vertical highpass filter 21b and adder 24 of FIG. 2 eliminated. With the third embodiment, a vertical high-frequency component (vertical high-frequency component of a following field), being extracted from a vertical highpass filter 21b, is input directly to an adder 23 where it, together with a vertical low-frequency component, is synthesized.

FIG. 5 shows a fourth embodiment of the present invention.

The fourth embodiment corresponds to the second embodiment with the field delay circuit 13, vertical highpass filter 21a and adder 24 eliminated. A vertical high-frequency component (vertical high-frequency component of a preceding field), being extracted from a vertical highpass filter 21b, is supplied directly to an adder 23 where it, together with a vertical low-frequency component, is synthesized.

FIGS. 6A and 6B show a practical circuit form of the aforementioned vertical highpass filters 21a, 21b, 21c and practical circuit form of the vertical lowpass filter 22, respectively.

with the vertical highpass filter shown in FIG. 6A, a signal is input to an input terminal 50 and supplied from there to a line delay unit 51a for providing an amount of delay corresponding to one horizontal period and to a coefficient unit 52a having a coefficient $-(1/16)$. The output of the line delay unit 51a is supplied to a line delay unit 51b and to a coefficient unit 52b having a coefficient $(1/8)$. The output of the line delay unit 51b is supplied to a coefficient unit 52c having a coefficient $-(1/16)$. The outputs of the coefficient units 52a and 52c are supplied to an adder 53 where they are added together. The output of adder 53 is fed to an adder 54 and the output of the coefficient unit 52b is supplied to the adder 52b where both are added together. The output of the adder 54 is comprised of vertical high-frequency component, filter-processed between the lines and taken from an output terminal 55.

FIG. 6B shows a vertical lowpass filter.

In the vertical lowpass filter of FIG. 6B, a signal on an input terminal 59 is supplied to a line delay unit 56 and to a coefficient unit 57a having a coefficient $(1/2)$. The output of the line delay unit 56 is supplied to a coefficient unit 57b having a coefficient $(1/2)$. The outputs of the coefficient units 57a and 57b are added together at an adder 58 and taken, as a vertical low-frequency component, from an output terminal 60.

In the embodiments of FIGS. 2 and 3 using the aforementioned vertical highpass filter and vertical lowpass filter, scanning line interpolation processing is carried out on a principle of FIG. 7.

In FIG. 7, marks "o" represent scanning lines and a mark "Δ" represents a scanning line for which an interpolation is carried out. A vertical high-frequency component is extracted using inter-frame scanning lines and a vertical low-frequency component is extracted using intra-field scanning lines. These components are mutually synthesized. As appreciated from FIG. 7, at the scanning line marked as "Δ" the upper and lower scanning lines are weighted with a coefficient ½ for an n field, those scanning lines at the preceding and following fields are weighted with a coefficient ⅛ and those scanning lines in the slanting directions at the preceding and following fields are weighted with a coefficient–(1/16).

Figure 8A:
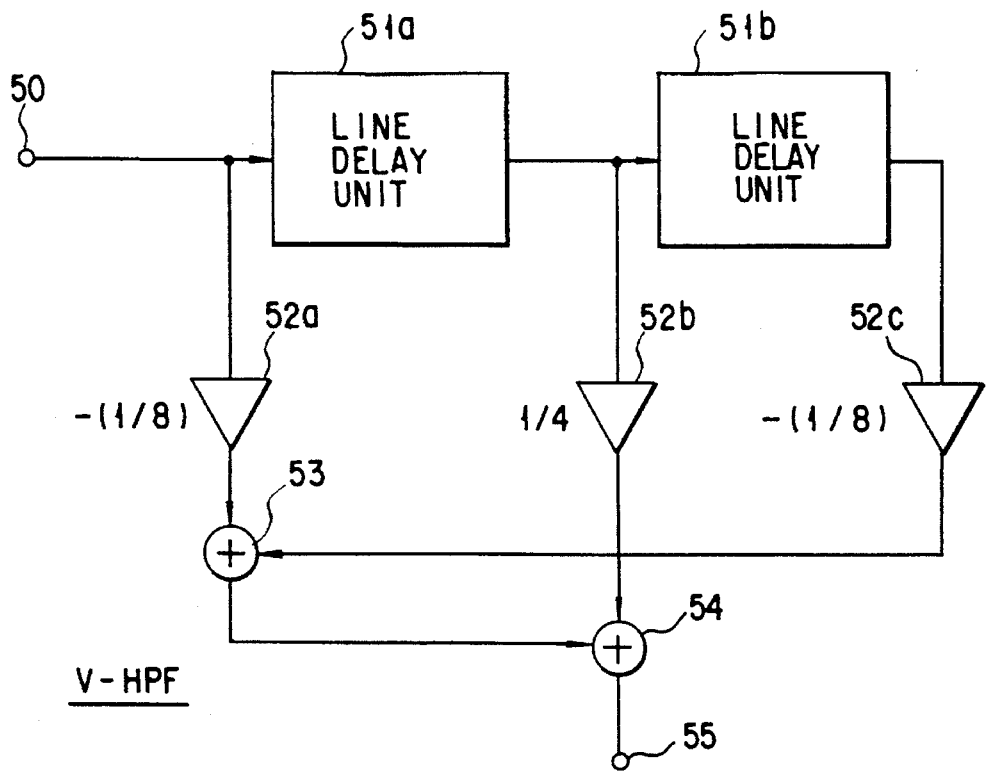
FIG. 8A is a schematic view showing another form of a vertical highpass filter used in the apparatus of the present invention.
Figure 8B:
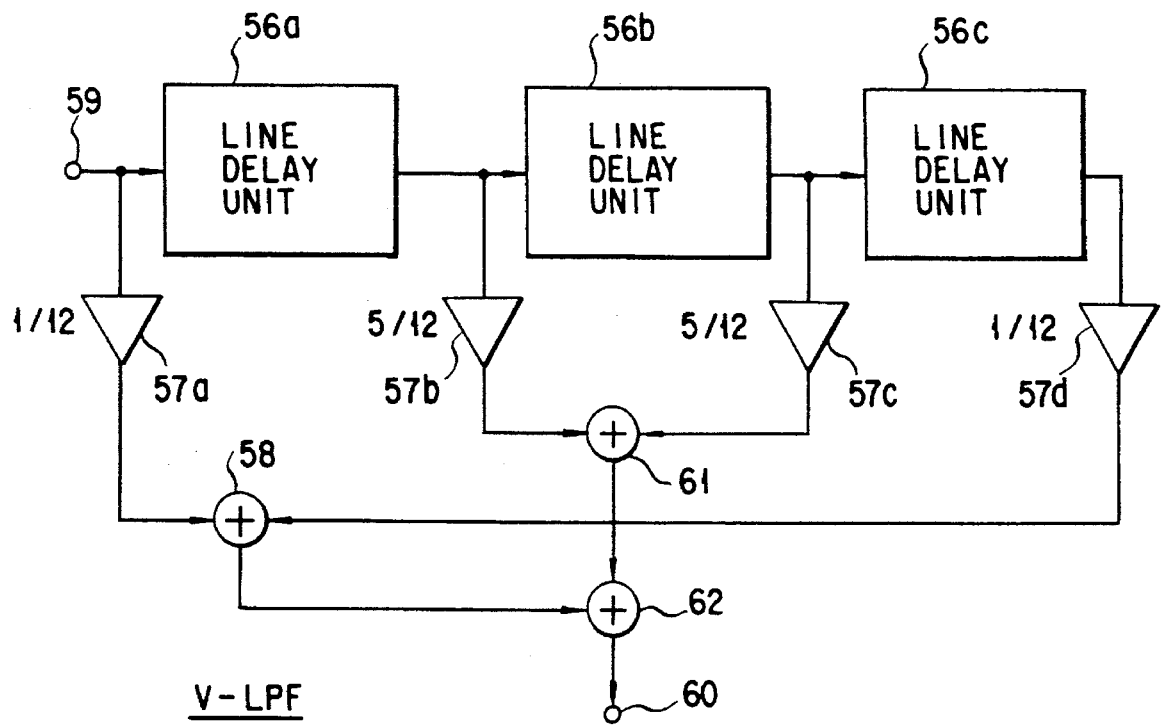
FIG. 8B is a schematic view showing another form of a vertical lowpass filter used in the apparatus of the present invention.

FIGS. 8A and 8B show another form of the vertical highpass filter (21a, 21b, 21c) and of the vertical lowpass filter (22).

FIG. 8A shows the vertical highpass filter which is different from the filter of FIG. 6A with respect to the coefficient –(⅛), (¼) and –(⅛) of coefficient units 52a, 52b and 52c. FIG. 8B shows the vertical lowpass filter. In this filter, a signal on an input terminal 59 is supplied to a coefficient unit 57a and to a line delay unit 56a. The output of the line delay unit 56a is supplied to a line delay unit 56b and to a coefficient unit 57b. The output of the line delay unit 56 is input to a line delay unit 56c and to coefficient unit 57c. The output of the line delay unit 56c is input to a coefficient unit 57d. The coefficients of these coefficient units 57a, 57b, 57c and 57d are 1/12, 5/12, 5/12 and 1/12, respectively. The outputs of the coefficient units 57a and 57d are added together at an adder 58 and the outputs of the coefficient units 57b and 57c are added together at an adder 61. The outputs of the adders 58 and 61 are added together at an adder 62 and the output of the adder 62 is output, as a vertical low-frequency component, from an output terminal 60.

FIG. 9 shows a state in which an interpolation scanning line is generated when the vertical highpass filter and vertical lowpass filter of FIG. 8 are applied to the embodiments of FIGS. 2 and 3. In FIG. 9, a mark "Δ" represents an interpolation scanning line and marks "○" represent those scanning lines utilized for interpolation. For an n field, those adjacent upper and lower scanning lines are weighted with a coefficient 5/12, those distanced upper and lower scanning lines are weighted with a coefficient (1/12), those scanning lines at the preceding and following fields are weighted with a coefficient ¼ and those scanning lines in a slanting direction at the preceding and following fields are weighted with a coefficient –(⅛).

In the case of FIGS. 8A and 8B, the vertical direction characteristic is extended as is preferable from a standpoint of vertical sharpness. In the case of FIG. 6, on the other hand, the vertical sharpness is somewhat degraded, but less residual image is obtained.

As set out above, this scanning line number converting apparatus can gain a natural quality of an image irrespective of whether it is a still image or a motion image. If the quality of an image is controlled in accordance with its movement, a still higher image quality can be obtained.

Figure 10:
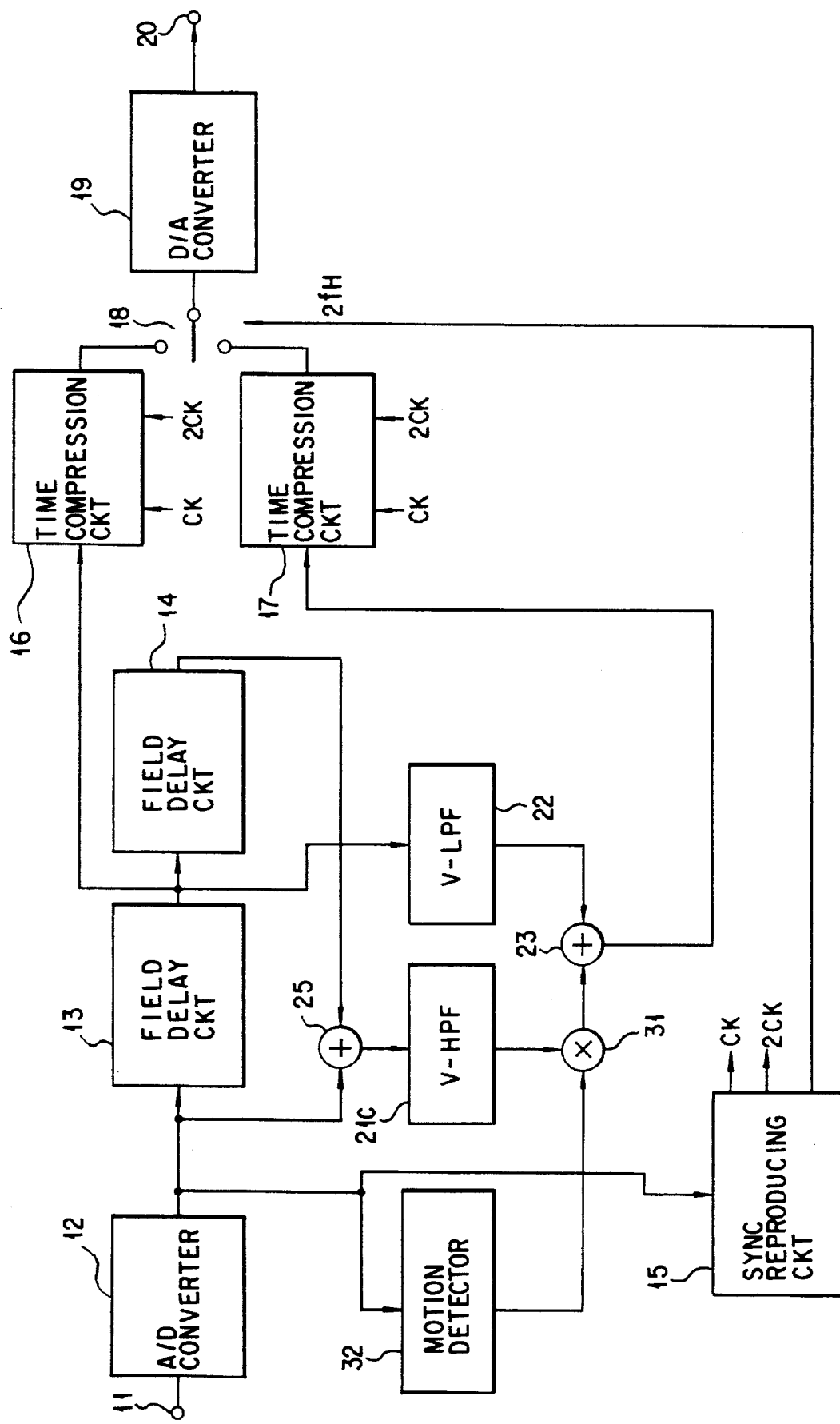
FIG. 10 is a schematic view showing an apparatus according to a fifth embodiment of the present invention.

FIG. 10 shows a fifth embodiment of the present invention.

The fifth embodiment is based on the second embodiment shown in FIG. 3 and a multiplier 31 is provided between a vertical highpass filter 21 and an adder 23. A motion detector 32 detects an image motion from an output signal of an A/D converter 12 and the multiple of a multiplier 25 is made variable by a motion detection signal. The other portions of the fifth embodiment are similar to those of the embodiment of FIG. 3. Here, if it is determined that an image involves more motion, the output of the motion detector 32 becomes smaller. Then the gain of the multiplier declines and less vertical high-frequency component is added at the preceding and following fields so that less residual image emerges. If, on the other hand, it is determined that a still image is involved, the gain of the multiplier 31 is increased and more high-frequency component is added at the preceding and following fields so that the vertical sharpness is improved.

Naturally, the filter characteristic allows the adoption of other characteristics. If, for example, V-HPF 21 of FIG. 10 is used such that, as the filter coefficients of FIG. 8A, the coefficients of coefficient units 52a, 52c are "0" and that of a coefficient 52b is "1", it is possible to obtain the best image quality for the still image.

Figure 11:
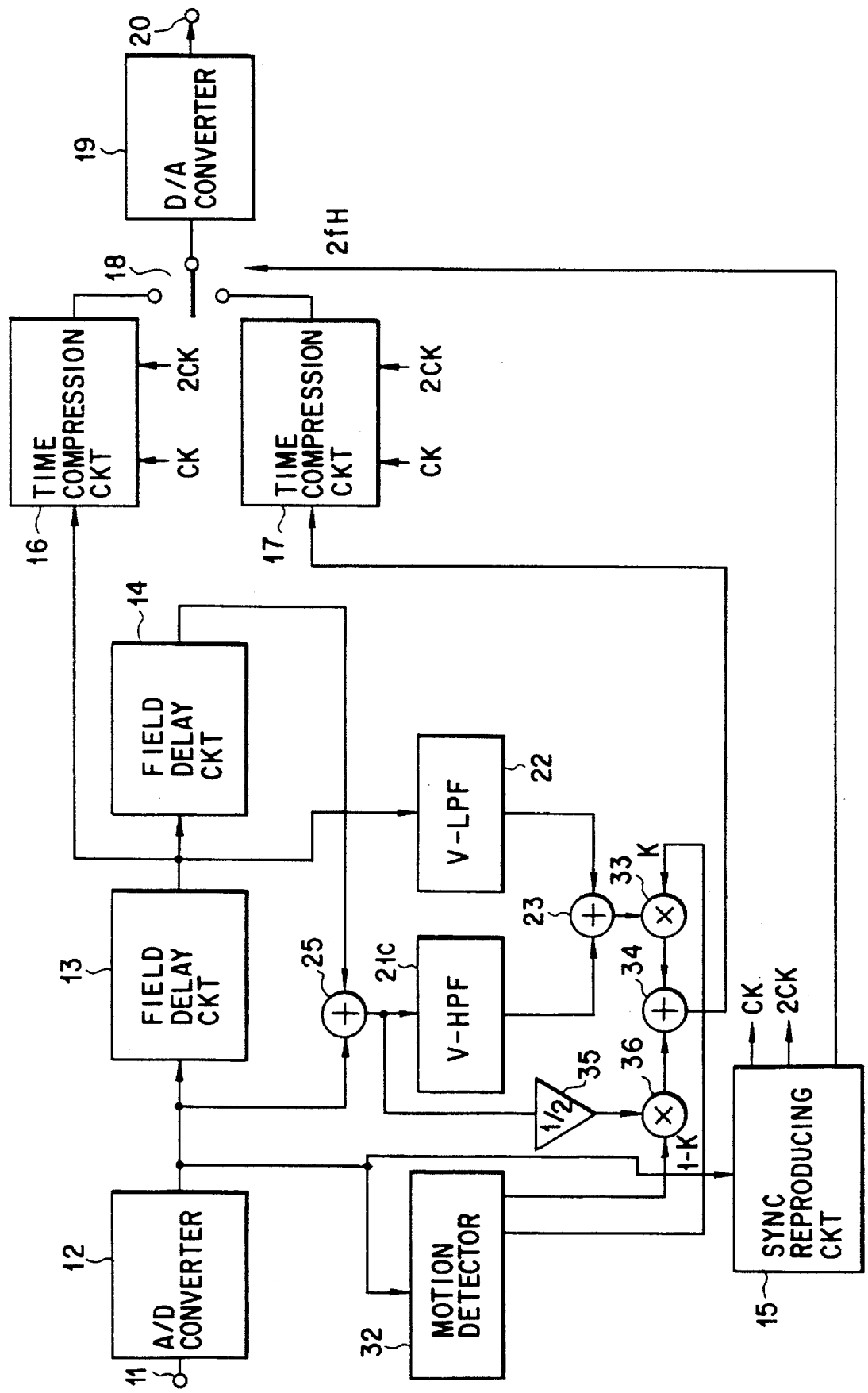
FIG. 11 is a schematic view showing an apparatus according to a sixth embodiment of the present invention.

FIG. 11 shows a sixth embodiment.

The sixth embodiment is based on the second embodiment shown in FIG. 3. An output of adder 23 is fed to a multiplier 33. An output of adder 25 is fed to a multiplier 36 through a coefficient ½ unit 35. The outputs of multipliers 36, 33 are added by adder 34 and the output of the adder 34 is connected to a time compression circuit 17. The other inputs of multipliers 36, 33 are connected to a motion detector 32. If the movement of the image is greater, a gain of the multiplier 33 is greater and a gain of the multiplier 36 is smaller, as controlled by the motion detector 32. The output of the adder 23 is the still picture-matching and the output of the adder 25 or the output of the unit 35 is the moving picture-matching. Both of them are selected or mixed through the multipliers 36, 33 and the adder 34, which is controlled by the motion detector 32.

As set out above, if an input is for a motion image in the process generating an interlaced scanning signal's interpolation scanning line, there is a high chance that the vertical low-frequency component will be generated in those fields involved. Therefore, there is almost no loss in those components visually important as information representing a motion. Further, those signals coming from the preceding and following fields are restricted to the vertical high-frequency components and is hard to detect as a residual image. For the still image, on the other hand, the vertical sharpness is lowered with the presence of only the vertical low-frequency components in the fields involved. However, the vertical sharpness is improved because the vertical high-frequency components are added from the preceding and following fields. As a result, it is possible for the present apparatus to obtain a natural and better interpolation scanning signal and to obtain progressive scanning signals ensuring a better image quality.

The present invention is not restricted to the aforementioned embodiments. In the second embodiment, for example, in order to obtain the preceding and following fields' vertical high-frequency components with respect to the vertical low-frequency components, the interlaced scanning signals are delayed by the field delay circuits 13 and 14 and the vertical high-frequency components are extracted from V-HPFs 21a and 21b. In addition to this method, it may also be possible to first extract vertical low-frequency components and vertical high-frequency components from the interlaced scanning signal and add together these components after time adjustment has been made by the field delay means. For example, it may be possible to obtain an interpolation signal by connecting V-HPFs 21a, 21b and V-LPF 22 directly to the output of the A/D converter 12 in FIG. 2, providing field delay units to the outputs of V-LPF 22, V-HPF 21b and adding together the outputs of these field delay units to the output of V-HPF 22a. Further, with the embodiment shown in FIG. 5, it may also be possible to omit the field delay circuit 14 and delay the output of V-HPF 21b by one field.

According to the present invention, as already set out above, an improved image quality can be obtained, upon the conversion of a scanning line number, irrespective of whether a motion image or a still image is involved.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A processing apparatus for converting a television scanning signal, comprising:

vertical low-frequency component extracting means for extracting a vertical low-frequency component from a first field of an interlaced scanning signal;

vertical high-frequency component extracting means for extracting a vertical high-frequency component from preceding and following fields of the first field of the interlaced scanning signal;

interpolation signal generating means for generating an interpolation scanning signal by adding together the vertical low-frequency component and vertical high-frequency component;

first means for time compressing the interlaced scanning signal;

second means for time compressing the interpolation scanning signal; and selecting means for alternately selecting outputs of the first and second time compressing means and for providing a progressive scanning signal.

2. The processing apparatus according to claim 1, wherein the vertical high-frequency component extracting means has a vertical highpass filter unit with an odd number of taps; and the vertical low-frequency component extracting means has a vertical lowpass filter unit with an even number of taps.

3. The processing apparatus according to claim 1, wherein the vertical high-frequency component extracting means includes vertical highpass filters having tap coefficients of $-(1/16)$, $(1/8)$ and $-(1/16)$, respectively; and the vertical low-frequency component extracting means includes vertical lowpass filters having tap coefficients of $(1/2)$ and $(1/2)$, respectively.

4. The processing apparatus according to claim 1, wherein the vertical high-frequency component extracting means includes vertical highpass filters having tap coefficients of $-(1/8)$, $(1/4)$ and $-(1/8)$, respectively; and the vertical low-frequency component extracting means includes vertical lowpass filters having tap coefficients of $(1/12)$, $(5/12)$, $(5/12)$ and $(1/12)$, respectively.

5. The processing apparatus according to claim 1, further comprising motion detecting means for detecting an image motion of the interlaced scanning signal and control means for controlling an amount of vertical high-frequency component output from the vertical high-frequency component means, in accordance with an image motion detection signal from the motion detecting means, these motion detecting means and control means being provided so as to control a gain of the vertical high-frequency component in accordance with an image motion.

6. A processing apparatus for converting a television scanning signal, comprising:

vertical high-frequency component extracting means for extracting a vertical high-frequency component from an interlaced scanning signal;

vertical low-frequency component extracting means for extracting a vertical low-frequency component from the interlaced scanning signal;

field delay means for delaying by an amount corresponding to at least one field the interlaced scanning signal, and for providing a first field, a preceding field, and a following field of the interlaced scanning signal; and interpolation signal generating means for adding the vertical high-frequency components extracted from the preceding and following fields provided by the field delay means to the vertical low-frequency component extracted from the first field provided by the field delay means and for generating an interpolation scanning signal.

\* \* \* \* \*